United States Patent
Suryanarayana et al.

(10) Patent No.: US 11,126,725 B2
(45) Date of Patent: Sep. 21, 2021

(54) SECURE FIRMWARE CAPSULE UPDATE USING NVME STORAGE AND METHOD THEREFOR

(71) Applicant: DELL PRODUCTS, LP, Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

(*) Notice: Subject to any disclaimer, the term of this patent is extended or adjusted under 35 U.S.C. 154(b) by 147 days.

(21) Appl. No.: 16/438,807

(22) Filed: Jun. 12, 2019

(65) Prior Publication Data
US 2020/0394303 A1    Dec. 17, 2020

(51) Int. Cl.
G06F 21/57    (2013.01)
G06F 8/654    (2018.01)

(52) U.S. Cl.
CPC ............ G06F 21/572 (2013.01); G06F 8/654 (2018.02)

(58) Field of Classification Search
CPC .............................. G06F 8/654; G06F 21/572
See application file for complete search history.

(56) References Cited

U.S. PATENT DOCUMENTS

| | | | |
|---|---|---|---|
| 7,676,666 B2 | 3/2010 | Lambert et al. | |
| 9,507,581 B2 | 11/2016 | Butcher et al. | |
| 2005/0216753 A1* | 9/2005 | Dailey | G06F 21/6209 713/191 |
| 2011/0099627 A1* | 4/2011 | Proudler | G06F 21/57 726/21 |
| 2014/0130034 A1 | 5/2014 | Subbu et al. | |
| 2015/0026378 A1 | 1/2015 | Brundridge et al. | |
| 2016/0154820 A1 | 6/2016 | Singh et al. | |
| 2016/0210769 A1 | 7/2016 | Suryanarayana et al. | |
| 2017/0010875 A1* | 1/2017 | Martinez | G06F 21/575 |
| 2017/0357500 A1 | 12/2017 | Vidyadhara et al. | |
| 2019/0042752 A1* | 2/2019 | Mihm | G06F 21/572 |
| 2019/0179628 A1* | 6/2019 | Bulusu | G06F 8/656 |
| 2019/0250900 A1* | 8/2019 | Troia | H04W 4/50 |

* cited by examiner

Primary Examiner — Gary Collins
(74) Attorney, Agent, or Firm — Larson Newman, LLP

(57) ABSTRACT

A method includes receiving a firmware update package at an information handling system, the package including a payload containing a first firmware image. In response to executing the firmware update package while the information handling system is under control of an operating system, identifying a non-volatile storage device; authenticating the first firmware image; and storing the first firmware image at the non-volatile storage device. In response to successfully authenticating the first firmware image, initiating a reboot of the information handling system to invoke an initialization routine. The initialization routine includes retrieving the first firmware image from the non-volatile storage device and installing the first firmware image at a first device.

20 Claims, 5 Drawing Sheets

US 11,126,725 B2

SECURE FIRMWARE CAPSULE UPDATE USING NVME STORAGE AND METHOD THEREFOR

FIELD OF THE DISCLOSURE

This disclosure generally relates to information handling systems, and more particularly relates secure firmware capsule update using NVMe storage at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include receiving a firmware update package at an information handling system, the package including a payload containing a first firmware image. In response to executing the firmware update package while the information handling system is under control of an operating system, identifying a non-volatile storage device; authenticating the first firmware image; and storing the first firmware image at the non-volatile storage device. In response to successfully authenticating the first firmware image, initiating a reboot of the information handling system to invoke an initialization routine. The initialization routine includes retrieving the first firmware image from the non-volatile storage device and installing the first firmware image at a first device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes a basic input/output system (BIOS) that is responsible for initializing hardware components and subsystems and to load an operating system during a startup process of the system. The BIOS is typically stored at a non-volatile memory device, for example a flash memory device. An information handling system is usually delivered to a customer with an initial version of the BIOS already installed at the flash memory device. During the lifetime of the information handling system, it may become necessary or advisable to update the BIOS with a new version having one or more firmware revisions. The update procedure is often referred to as flashing the BIOS. For example, a user may download a program that includes a payload containing one or more BIOS images. When executed, the update program can initiate a re-boot of the information handling system, and the new BIOS image can be installed. FIGS. 1-5 illustrate techniques for improving the security and efficiency of the firmware update procedure at an information handling system.

Figure 1:
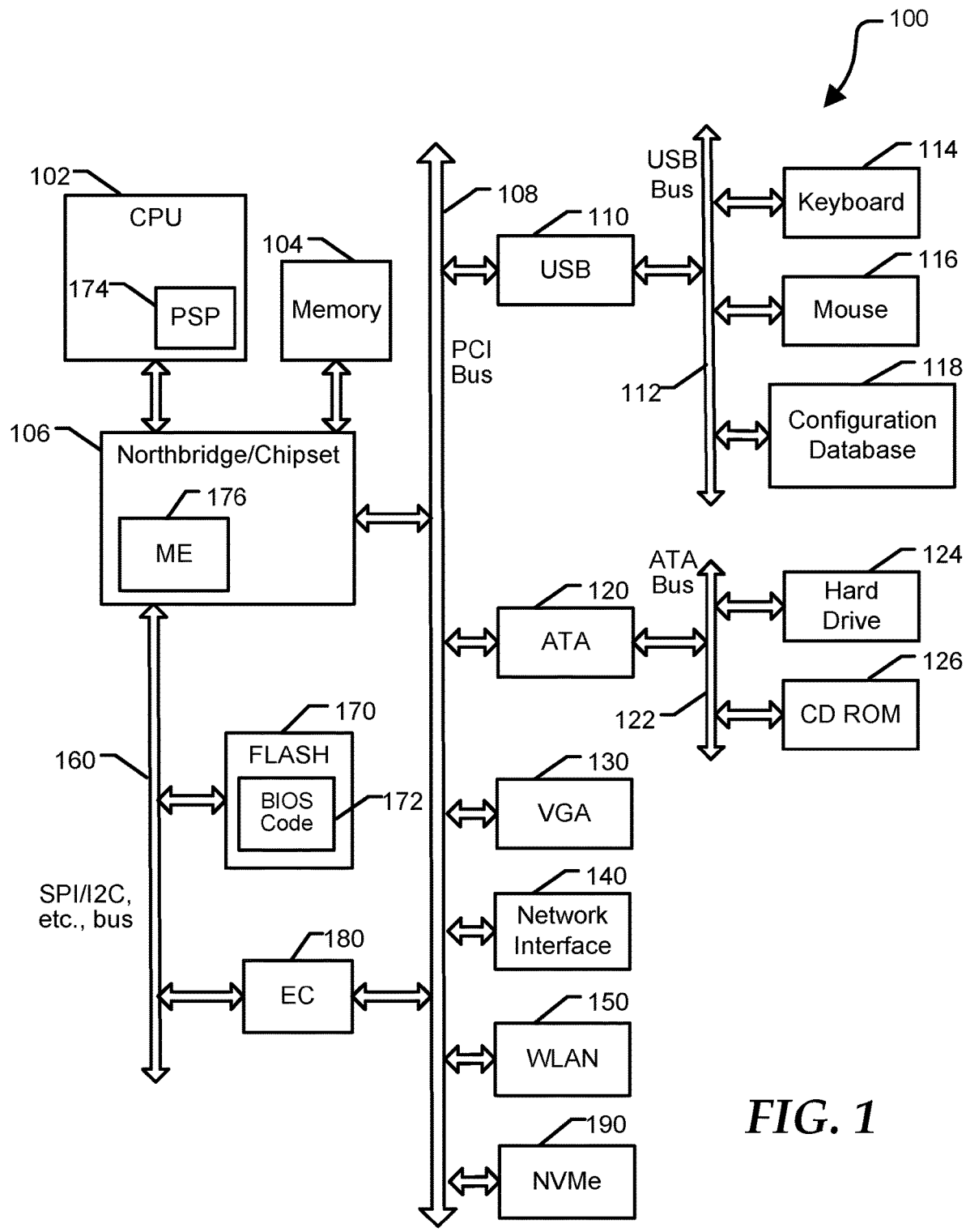
FIG. 1 is a block diagram of an information handling system according to an embodiment of the present disclosure.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a flash memory device 170 for storing BIOS code 172, an embedded controller (EC) 180, and a non-volatile memory express (NVMe) device 190 and associated host controller interface. Flash memory device 170 can be referred to as a SPI flash device, BIOS non-volatile random access memory (NVRAM), and the like. EC 180 can be referred to as a service processor, a baseboard management controller, and the like. EC 180 is configured to provide out-of-band access to devices at information handling system 100. As used herein, out-of-band access herein refers to operations performed without support of CPU 102, such as prior to execution of BIOS code 172 by processor 102 to initialize operation of system 100.

In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors. PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems. In another embodiment, EC 190 can provide aspects of a hardware root of trust. The root of trust relates to software processes and/or hardware devices that ensure that firmware and other software necessary for operation of an information handling system is operating as expected.

For simplicity, NVMe 190 refers to a non-volatile storage media attached to a PCI Express (PCIe) bus. NVMe 190 can include an internally mounted computer expansion memory card, for example an M.2 card, and the like. NVMe 190 is compliant with a non-volatile host controller interface, for example the Non-Volatile Host Controller Interface Specification (NVMHCIS). NVMe 190 can provide increased performance compared to a solid state drive (SSD) that interface to CPU 102 via ATA bus 122 or the like.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 can be referred to as a firmware image, and the term BIOS is herein used interchangeably with the term firmware image, or simply firmware. In an embodiment, BIOS 172 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

BIOS code 172 includes instructions executable by CPU 102 to initialize and test the hardware components of system 100, and to load a boot loader or an operating system (OS) from a mass storage device. BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

As described above, it may become necessary or advisable to update the BIOS with a new version having one or more firmware revisions. Today, the update process often begins by executing a firmware update program during runtime. As used herein, the term runtime refers to the point in time after firmware initialization where control of information handling system 100 has transitioned to an operating system (OS). For example, the runtime update program can utilize the UEFI Secure Capsule methodology, wherein the update program includes a payload containing revised firmware to replace corresponding existing firmware. During the traditional capsule update method, one or more firmware images included in the payload are stored at volatile system memory, for example memory 104. During the update procedure, system 100 may need to be restarted multiple times, and storage of the updated firmware at memory 104 must persist while system 100 is restarted. Because of differences in how the earliest stages of platform initialization are performed, for example differences between the AMD and Intel CPU and chipset architectures, preservation of the update images in memory 104 across system restarts can be problematic. In another scenario, hard drive storage space can be used to temporarily store the updated firmware payload during the update process, but now the system initialization process must advance to a point where a bootable disk device is selected, partitions are enumerated, and the payload is located before performing the firmware update.

The traditional UEFI capsule update method can be vulnerable to various malicious attacks. A local authenticated attacker may be able to execute arbitrary code with the privileges of system firmware, potentially allowing for persistent firmware level rootkits, bypassing of Secure Boot protocols, or permanently corrupting the system platform. For example, during the Drive Execution Environment (DXE) phase of the UEFI boot process, the contents of the capsule image are parsed and validated. However, an integer overflow vulnerability can exist during the capsule processing phase that can cause allocation of a buffer to be unexpectedly small, allowing attacker-controlled data to be written past the bounds of the buffer. Because the new firmware is stored in volatile memory, the update process can fail if there is a loss of power at information handling system 100 before the update process completes. Alternatively, the new firmware may be temporarily stored at a hard drive, such as hard drive 124. However storing the updated images to a hard drive can be problematic as well, as doing so can introduce further exploit vulnerabilities and opportunities for data corruption. In addition, legacy modes of operation may not provide a method to consistently locate the on-disk updated images following one or more system restart events. Techniques disclosed herein provide multiple improvements over the existing update schemes. For example, the techniques are platform chipset independent, which is beneficial given the diverging initialization architectures described above. In addition, authentication of the updated images included in the firmware capsule is performed during runtime, and only a single restart of the information handling system is required to complete the update process.

Figure 2:
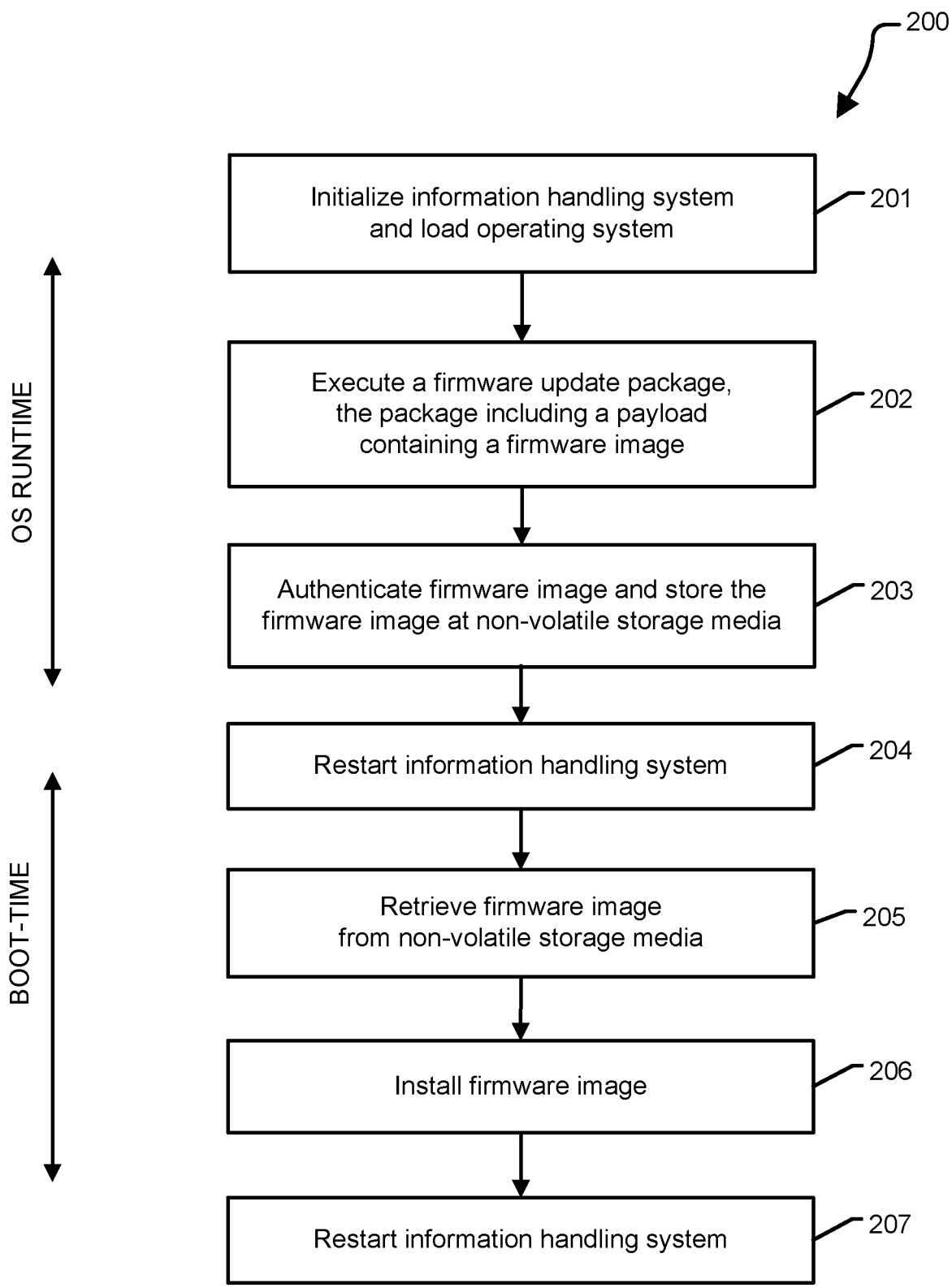
FIG. 2 is a flow diagram illustrating a method for updating firmware at an information handling system according to a specific embodiment of the present disclosure.

FIG. 2 shows a method 200 for updating firmware at an information handling system according to a specific embodiment of the present disclosure. Method 200 provides an overview of the disclosed techniques that are described below in greater detail. Method 200 begins at block 201 where an information handling system has completed initialization and passed control to an operating system, referred to herein as the runtime environment. For example, following a reset, restart, or upon receiving power, information handling system 100 can complete the BIOS initialization phases by loading an operating system such as Windows. At block 202, a firmware update package is executed. The update package includes a payload containing one or more firmware images. For example, a Windows Update server or similar update administration service can host the firmware update package and facilitate dissemination of the update package to one or more information handling systems. Alternatively, a user of the information handling system may download the firmware update package from an original equipment provider or the like, and a BIOS update can be initiated when the package is executed.

As used herein, the term firmware image can include primary platform initialization firmware as well as firmware associated with other platform devices.

Method 200 continues at block 203 where each of the one or more firmware images included in the payload is authenticated, and stored at a non-volatile memory device included at the information handling system. The authentication can include the use of digital signatures. Authentication of the new firmware images is typically performed during the boot process according to the EFI firmware management protocol (FMP) specification. As disclosed herein, authentication of the new firmware images received via the update package firmware capsule is instead authenticated during runtime. The new firmware images are stored at a non-volatile memory device such as NVMe 190, a non-volatile dual in-line memory module (NVDIMM) device, and the like. A system variable is set to indicate that a firmware update is pending.

At block 204, the information handling system is restarted and begins executing system firmware to initialize the system. During BIOS initialization, system 100 can detect that a firmware update is pending, and method 200 proceeds to block 205 where the firmware image(s) that were stored at block 203 are retrieved. At block 206, the firmware image(s) are installed. Because the images were already authenticated during runtime, further authentication of the images during boot time is not necessary. Once the images have been installed, method 200 completes at block 207 where the information handling system can be restarted, utilizing the updated firmware.

Figure 3:
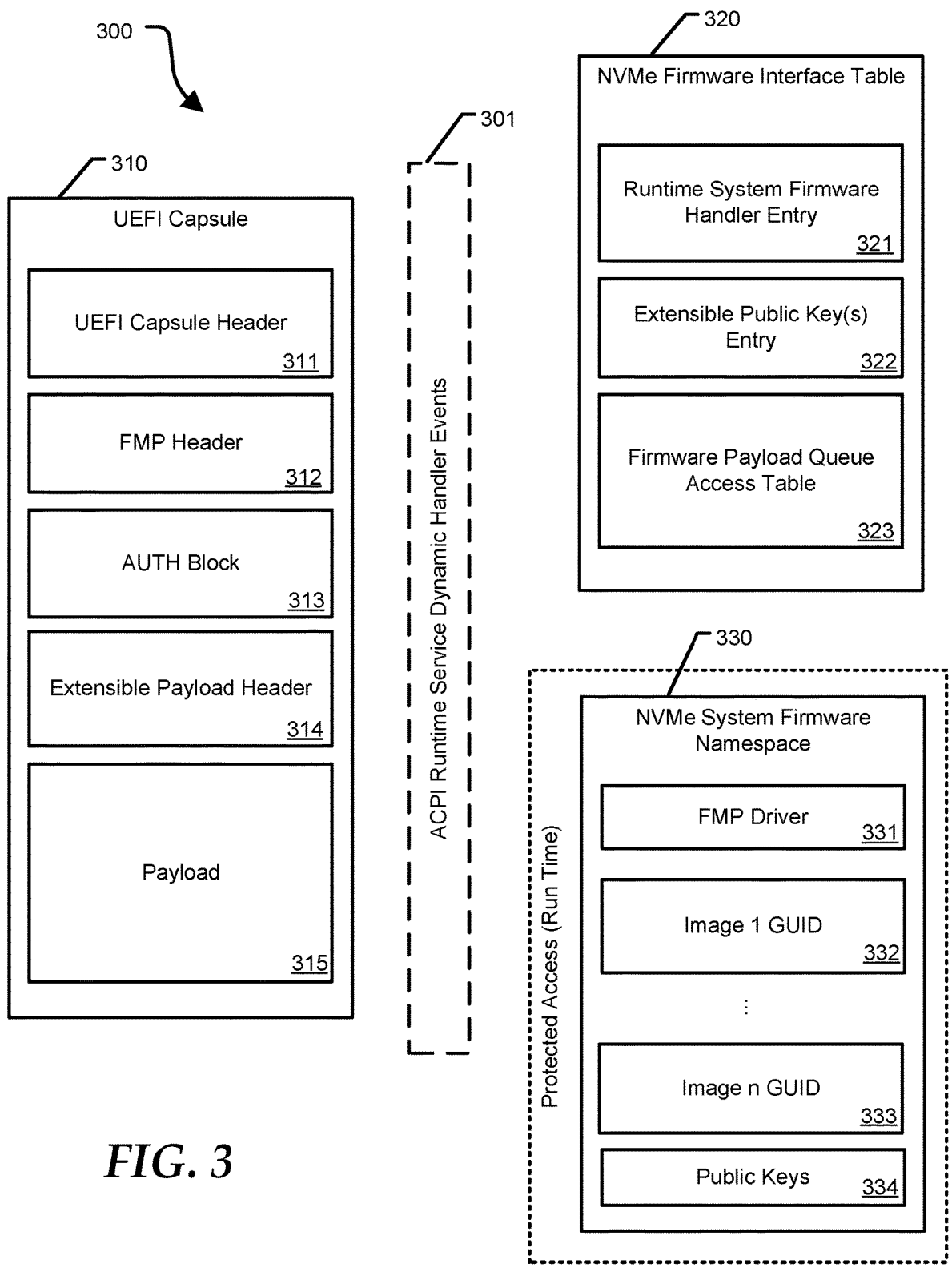
FIG. 3 is a block diagram providing a graphical representation of the method of FIG. 2, according to a specific embodiment of the present disclosure.

FIG. 3 shows a graphical representation 300 of the method of FIG. 2, according to a specific embodiment of the present disclosure. FIG. 3 depicts a UEFI capsule 310, an NVMe firmware interface table (FIT) 320, and System Firmware at NVMe Namespace 330. FIG. 3 also shows a block 301 representing ACPI runtime service dynamic handler events. UEFI capsule 310 includes a UEFI capsule header 311, a FMP header 312, an AUTH block 313, an extensible payload header 314, and a payload 315. NVMe FIT 320 includes a runtime system firmware handler entry 321, extensible public key(s) entry 322, and a firmware payload queue access table (FPQA) 323. NVMe system firmware namespace, included at NVMe 190, includes an FMP driver 331, firmware images 332 and 333 identified by respective GUIDs, and public keys 334.

NVMe FIT 320 is generated during boot time and can be installed using the EFI_ACPI_TABLE_PROTOCOL function. NVMe FIT 320 is stored at SPI flash device 170. Table 320 is similar to the NVDIMM firmware interface table (NFIT) as defined in the UEFI and ACPI specifications. In response to executing a firmware update package containing UEFI capsule 310, ACPI runtime service 301 is triggered and NVMe FIT 320 is accessed. FIT 320 identifies System Firmware at NVMe Namespace 330 at NVMe 190. Runtime system firmware handler 321 is configured to scan the payload 315 and generate an inventory of firmware images included in the payload. The inventory includes a size, version, type, and signatures of each imaged. In an alternative embodiment, a system management mode (SMM) handler can be used instead of ACPI runtime handler 301. In still another embodiment, non-volatile memory included at an NVDIMM can provide a system firmware namespace to store the new firmware images, which is identified by an NVDIMM FIT (NFIT).

Runtime system firmware handler 321 indexes into System Firmware at NVMe Namespace 330 and returns FMP driver 331 and public keys 334, which initiates runtime authentication of the firmware images included in the inventory. The runtime authentication using extensible secure keys is similar in operation to the UEFI authentication protocol utilized during boot time by the traditional firmware update method. The authentication keys can be dynamically added from an authenticated source having secure access to protected System Firmware at NVMe Namespace 330. The runtime services utilize protected memory space at memory 104 that is associated with ACPI runtime services, and the protected memory space is not accessible by normal runtime programs. Successfully authenticated firmware images, for example image 332 and image 333, are each stored at System Firmware at NVMe Namespace 330. Each firmware image is identified by a GUID. The runtime service now initiates a reboot of system 100 and the new firmware images stored at NVMe 190 are installed at corresponding device storage devices during boot time, for example at SPI flash device 170.

Figure 4:
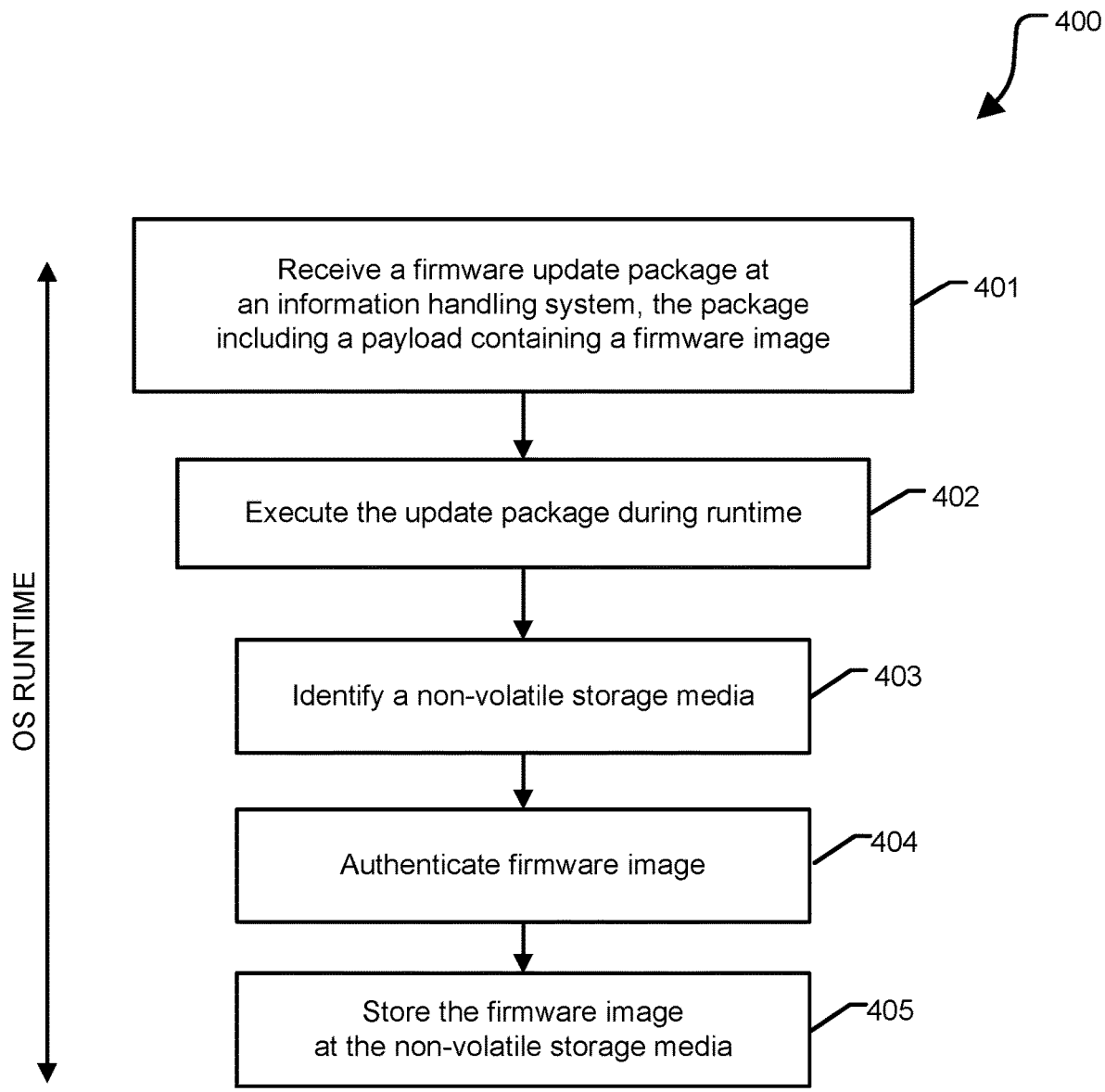
FIG. 4 is a flow diagram illustrating a method for updating firmware at an information handling system according to another embodiment of the present disclosure.

The preceding runtime operations are illustrated by method 400 of FIG. 4, according to specific embodiments of the present disclosure. Method 400 begins at block 401 where a firmware update package is received at an information handling system, for example information handling system 100. The firmware update package includes a payload containing one or more firmware images. At block 402, the update package is executed, and each of the following operations is performed during runtime. At block 403, a non-volatile storage media is identified. For example, an ACPI runtime service can access NVMe FIT 320, which spawns runtime system firmware handler 321. At block 403, each firmware image included at the update package is authenticated using public key cryptography and optionally other validation procedures. Method 400 completes at block 405 where the authenticated images are stored at the non-volatile storage device identified by FIT 320, for example NVMe 190. The identified non-volatile device provides temporary storage of the new image(s) so that they can be used during a subsequent boot sequence to update corresponding device images.

Figure 5:
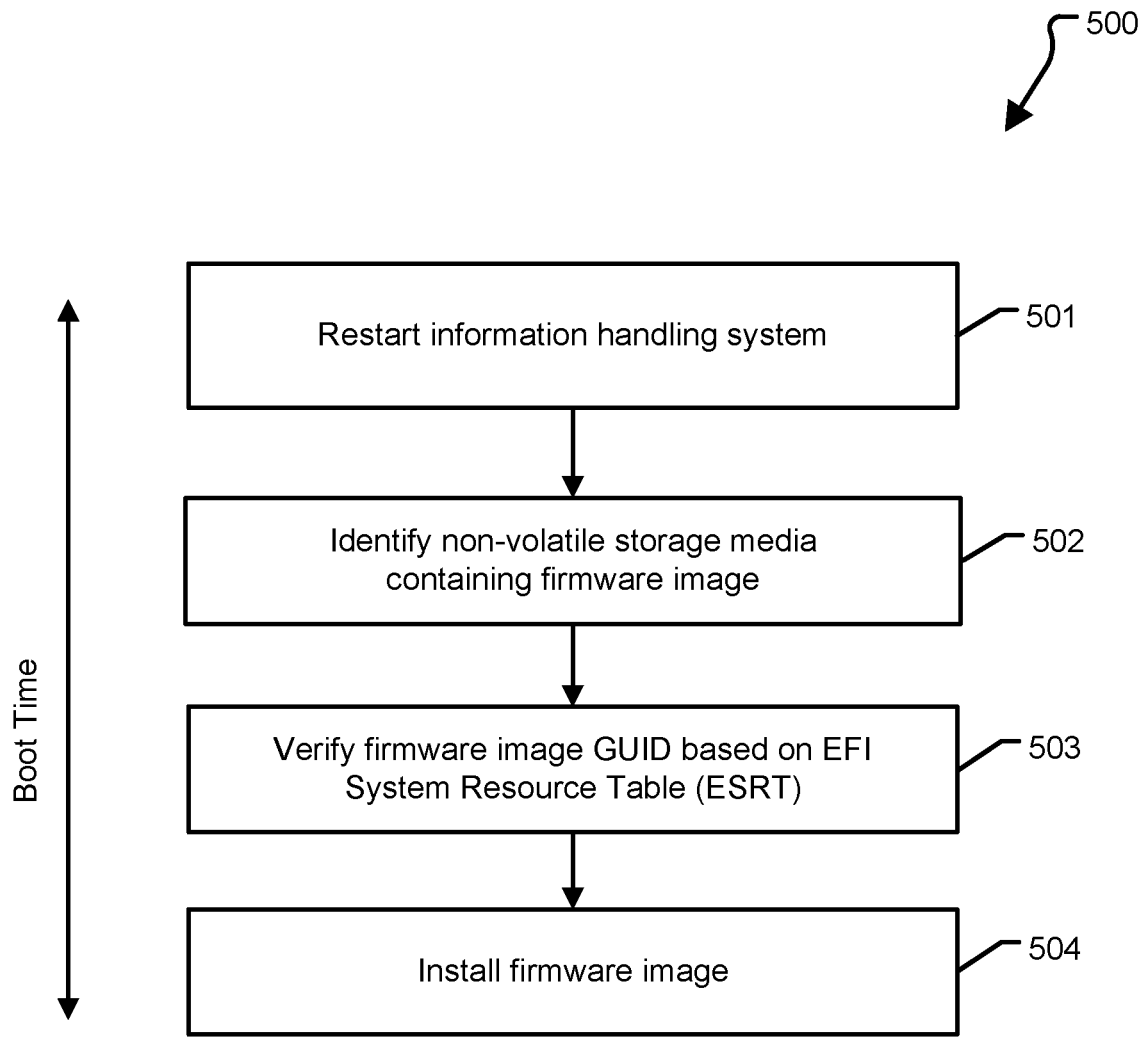
FIG. 5 is a flow diagram illustrating a method for updating firmware at an information handling system according to still another embodiment of the present disclosure.

FIG. 5 shows a method 500 for updating firmware at an information handling system according to specific embodiments of the present disclosure. Method 500 is performed after method 400 completes and begins at block 501 where the information handling system is restarted. The following operations are performed during boot time. After completing pre-EFI platform initialization, system firmware identifies that a firmware capsule update is pending. At block 502 the non-volatile storage media containing the authenticated firmware image(s) is identified, for example System Firmware at NVMe Namespace 330. At block 503, FMP driver 331 verifies that each of the images stored at NVMe 190 correspond to legitimate devices at system 100 based on information provided by the EFI System Resource Table (ESRT). The ESRT provides a mechanism for identifying device and system firmware resources for the purposes of targeting firmware updates to those resources. Each entry in the ESRT describes a device or system firmware resource that can be targeted by a firmware capsule update. Method 500 completes at block 504 where each firmware image stored at NVMe 190 is installed at a respective device, thereby updating a version of the firmware presently stored at the device. A subsequent restart of system 100 will utilize the updated firmware. The techniques disclosed above overcome complexities and security vulnerabilities of conventional firmware update methods utilizing volatile system memory or a hard drive to store capsule images prior to updating. Furthermore, because authentication of the images is performed during runtime, only a single reboot of system 100 is necessary to complete the update process.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving a firmware update package at an information handling system (IHS), the package including a payload containing a first firmware image;
   in response to executing the firmware update package while the IHS is under control of an operating system, initiating an Advanced Configuration and Power Interface (ACPI) runtime service dynamic handler event;
   identifying a non-volatile memory express (NVMe) storage device;
   authenticating the first firmware image; and
   storing the first firmware image at the NVMe storage device; and
   in response to successfully authenticating the first firmware image, initiating a reboot of the IHS to invoke an initialization routine, the routine including:
   retrieving the first firmware image from the NVMe storage device; and
   installing the first firmware image at a first device.

2. The method of claim 1, wherein the ACPI runtime service dynamic handler event identifies an ACPI firmware interface table corresponding to the NVMe storage device.

3. The method of claim 2, wherein the ACPI firmware interface table includes a runtime system firmware handler entry identifying system firmware namespace included at the NVMe storage device.

4. The method of claim 3, wherein the system firmware namespace includes a Unified Extensible Firmware Interface firmware management protocol.

5. The method of claim 1, wherein the first firmware image includes firmware to be stored at a serial peripheral interface flash memory device.

6. The method of claim 1, further comprising:
   determining that a first firmware configuration option is enabled at a basic input/output system setup interface, the configuration option specifying use of the NVMe storage device to provide temporary storage of the first firmware image prior to installing the first firmware image at the first device.

7. The method of claim 1, further comprising:
   determining that a first firmware configuration option is enabled at a basic input/output system setup interface, the configuration option specifying runtime authentication of the first firmware image.

8. The method of claim 1, further comprising verifying that a global unique identifier associated with the first firmware image is included at an extensible firmware interface system resource table.

9. An information handling system comprising:
   a non-volatile memory express (NVMe) device;
   a first device supporting updatable firmware;
   a basic input/output system setup interface including a configuration option specifying use of the NVMe device to provide temporary storage of the first firmware image prior to installing the first firmware image at the first device; and
   a central processing unit (CPU) configured to execute instructions during a run-time mode of operation and to execute instructions during a boot-time mode of operation,
   wherein during the run-time mode of operation, the CPU is configured to execute instructions to:
   receive a firmware update package, the package including a payload containing a first firmware image;
   identify the NVMe device;
   authenticate the first firmware image; and
   store the first firmware image at the NVMe device; and
   wherein during the boot-time mode of operation, the CPU is configured to execute instructions to:
   retrieve the first firmware image from the NVMe device; and
   install the first firmware image at the first device.

10. The information handling system of claim 9, wherein executing the firmware update package initiates an Advanced Configuration and Power Interface (ACPI) runtime service dynamic handler event.

11. The information handling system of claim 10, wherein the ACPI runtime service dynamic handler event identifies an ACPI firmware interface table corresponding to the NVMe device.

12. The information handling system of claim 11, wherein the ACPI firmware interface table includes a runtime system firmware handler entry identifying system firmware namespace included at the NVMe storage device.

13. The information handling system of claim 12, wherein the system firmware namespace includes a Unified Extensible Firmware Interface firmware management protocol.

14. The information handling system of claim 9, further comprising a serial peripheral interface (SPI) flash memory device, wherein the first firmware image includes firmware to be stored at the flash memory device.

15. The information handling system of claim 9, further comprising system firmware instruction executable by the CPU to provide a basic input/output system setup interface including a configuration option specifying runtime authentication of the first firmware image.

16. A method comprising:
   receiving a firmware update package at an information handling system (IHS), the package including a payload containing a first firmware image to update firmware at a first device;
   verifying that a global unique identifier associated with the first firmware image is included at an extensible firmware interface system resource table;
   in response to executing the firmware update package while the IHS is under control of an operating system:
      identifying a non-volatile memory express (NVMe) device;
      authenticating the first firmware image; and
      storing the first firmware image at the NVMe device; and
   in response to successfully authenticating the first firmware image, initiating a reboot of the IHS to invoke an initialization routine, the routine including:
      retrieving the first firmware image from the NVMe device; and
      installing the first firmware image at the first device.

17. The method of claim 16, wherein executing the firmware update package initiates an Advanced Configuration and Power Interface (ACPI) runtime service dynamic handler event.

18. The method of claim 17, wherein the ACPI runtime service dynamic handler event identifies an ACPI firmware interface table corresponding to the NVMe storage device, and wherein the ACPI firmware interface table includes a runtime system firmware handler entry identifying system firmware namespace included at the NVMe storage device.

19. The method of claim 16, further comprising:
   determining that a first firmware configuration option is enabled at a basic input/output system setup interface, the configuration option specifying runtime authentication of the first firmware image.

20. The method of claim 16, further comprising:
   determining that a first firmware configuration option is enabled at a basic input/output system setup interface, the configuration option specifying use of the NVMe storage device to provide temporary storage of the first firmware image prior to installing the first firmware image at the first device.

\* \* \* \* \*